US009697285B2

(12) United States Patent
Blue et al.

(10) Patent No.: US 9,697,285 B2
(45) Date of Patent: Jul. 4, 2017

(54) SEGMENTATION OF PROFESSIONAL NETWORK UPDATE DATA

(71) Applicant: LinkedIn Corporation, Mountain View, CA (US)

(72) Inventors: Allen Blue, Sunnyvale, CA (US); Joff Redfern, Truckee, CA (US); Paul Taylor Ogilvie, Palo Alto, CA (US); Joseph Paul Betz, Mountain View, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

(21) Appl. No.: 14/592,810

(22) Filed: Jan. 8, 2015

(65) Prior Publication Data

US 2015/0149453 A1 May 28, 2015

Related U.S. Application Data

(63) Continuation of application No. 13/303,812, filed on Nov. 23, 2011.

(60) Provisional application No. 61/416,722, filed on Nov. 23, 2010.

(51) Int. Cl.
*G06F 17/30* (2006.01)

(52) U.S. Cl.
CPC .... *G06F 17/30864* (2013.01); *G06F 17/3053* (2013.01)

(58) Field of Classification Search
CPC ....................... G06F 17/3053; G06F 17/30864
See application file for complete search history.

(56) References Cited

U.S. PATENT DOCUMENTS

| | | | | |
|---|---|---|---|---|
| 8,060,405 | B1 | 11/2011 | Lawrence | |
| 8,306,922 | B1 | 11/2012 | Kunal et al. | |
| 8,468,143 | B1 * | 6/2013 | Oztekin | G06F 17/30554 707/706 |
| 9,229,900 | B2 | 1/2016 | Blue et al. | |
| 2006/0042483 | A1 | 3/2006 | Work et al. | |
| 2007/0118802 | A1 * | 5/2007 | Gerace | G06F 17/30867 715/738 |
| 2007/0156636 | A1 * | 7/2007 | Norton | G06F 17/30997 |

(Continued)

OTHER PUBLICATIONS

"U.S. Appl. No. 14/085,402, Notice of Allowance mailed Aug. 26, 2015", 16 pgs.

(Continued)

*Primary Examiner* — Cam-Y Truong
(74) *Attorney, Agent, or Firm* — Schwegman Lundberg & Woessner, P.A.

(57) ABSTRACT

Users belonging to a particular category at a networking site are monitored by a system and according to a method for their selection of articles from a networking update stream. The characteristics of the users, including the categories they belong to, are received as metadata corresponding to the each respective article. Periodically an article database is queried according to the category and a selected time period to determine the number of users that have chosen to follow the industry and that have initiated selection actions towards articles in the database. Articles from the query are ranked according to their popularity among users having interest in the same industry category and are presented to a viewing user at the networking site.

12 Claims, 10 Drawing Sheets

(56) References Cited

U.S. PATENT DOCUMENTS

2007/0260520 A1 11/2007 Jha et al.
2008/0024520 A1* 1/2008 Rudd ................ G06F 17/30017 345/619
2008/0209351 A1* 8/2008 Macadaan ............. G06F 3/0482 715/762
2009/0086720 A1 4/2009 Westlake
2009/0307129 A1 12/2009 Matkowsky et al.
2009/0327232 A1 12/2009 Carter et al.
2010/0268720 A1 10/2010 Spivack et al.
2011/0066615 A1 3/2011 Pradhan et al.
2011/0191311 A1 8/2011 Polonsky et al.
2011/0289011 A1* 11/2011 Hull ..................... G06Q 10/107 705/319
2012/0079023 A1 3/2012 Tejada-gamero et al.
2012/0110096 A1 5/2012 Smarr et al.
2012/0166530 A1 6/2012 Tseng
2012/0166532 A1 6/2012 Juan et al.
2012/0197881 A1 8/2012 Blue et al.
2013/0066711 A1 3/2013 Liyanage et al.
2013/0263020 A1 10/2013 Heiferman et al.
2013/0304731 A1 11/2013 Zheng et al.
2014/0019882 A1 1/2014 Chew et al.
2014/0129463 A1 5/2014 Grayevsky
2014/0143228 A1 5/2014 Blue et al.
2016/0112365 A1 4/2016 Blue et al.

OTHER PUBLICATIONS

"U.S. Appl. No. 14/967,030, Preliminary Amendment filed Dec. 17, 2015", 8 pgs.
"U.S. Appl. No. 13/303,/812, Response filed Mar. 19, 2015 to Notice of Non-Compliant Appeal Brief mailed Mar. 6, 2015", 7 pgs.
"U.S. Appl. No. 13/303,812, Advisory Action mailed Sep. 24, 2014", 3 pgs.
"U.S. Appl. No. 13/303,812, Appeal Brief filed Jan. 9, 2015", 18 pgs.
"U.S. Appl. No. 13/303,812, Decision on Pre-Appeal Brief Request mailed Dec. 9, 2014", 2 pgs.
"U.S. Appl. No. 13/303,812, Final Office Action mailed Jun. 19, 2014", 26 pgs.
"U.S. Appl. No. 13/303,812, Non Final Office Action mailed Feb. 14, 2014", 24 pgs.
"U.S. Appl. No. 13/303,812, Notice of Non-Compliant Appeal Brief mailed Mar. 6, 2015", 3 pgs.
"U.S. Appl. No. 13/303,812, Pre-Appeal Brief Request filed Oct. 24, 2014", 6 pgs.
"U.S. Appl. No. 13/303,812, Response filed Jun. 10, 2014 to Non Final Office Aciton mailed Feb. 14, 2014", 13 pgs.
"U.S. Appl. No. 13/303,812, Response filed Aug. 19, 2014 to Final Office Action mailed Jun. 19, 2014", 11 pgs.
"U.S. Appl. No. 14/085,402, Examiner Interview Summary mailed Mar. 23, 2015", 3 pgs.
"U.S. Appl. No. 14/085,402, Examiner Interview Summary mailed Jun. 13, 2014", 3 pgs.
"U.S. Appl. No. 14/085,402, Final Office Action mailed Apr. 6, 2015", 15 pgs.
"U.S. Appl. No. 14/085,402, Final Office Action mailed Aug. 1, 2014", 15 pgs.
"U.S. Appl. No. 14/085,402, Non Final Office Action mailed Mar. 10, 2014", 15 pgs.
"U.S. Appl. No. 14/085,402, Non Final Office Action mailed Nov. 20, 2014", 15 pgs.
"U.S. Appl. No. 14/085,402, Preliminary Amendment filed Dec. 7, 2013", 3 pgs.
"U.S. Appl. No. 14/085,402, Response filed Mar. 20, 2015 to Non Final Office Action mailed Nov. 20, 2015", 12 pgs.
"U.S. Appl. No. 14/085,402, Response filed Jun. 10, 2014 to Non Final Office Action mailed Mar. 10, 2014", 10 pgs.
"U.S. Appl. No. 14/085,402, Response filed Jul. 6, 2015 to Final Office Action mailed Apr. 6, 2015", 11 pgs.
"U.S. Appl. No. 14/085,402, Response filed Nov. 3, 2014 to Final Office Action mailed Aug. 1, 2014", 12 pgs.
"U.S. Appl. No. 13/303,812, Examiner Interview Summary mailed Apr. 7, 2016", 3 pgs.
"U.S. Appl. No. 13/303,812, Final Office Action mailed Jun. 14, 2016", 63 pgs.
"U.S. Appl. No. 13/303,812, Non Final Office Action mailed Feb. 25, 2016", 41 pgs.
"U.S. Appl. No. 13/303,812, Response filed May 25, 2016 to Non Final Office Action mailed Feb. 25, 2016", 11 pgs.
"U.S. Appl. No. 14/967,030, Examiner Interview Summary mailed Jun. 27, 2016", 3 pgs.
"U.S. Appl. No. 14/967,030, Non Final Office Action mailed May 5, 2016", 18 pgs.
"U.S. Appl. No. 14/967,030, Response filed Jul. 19, 2016 to Non Final Office Action mailed May 5, 2016", 12 pgs.
U.S. Appl. No. 13/303,812, filed Nov. 23, 2011, Segmentation of Professional Network Update Data.
U.S. Appl. No. 14/085,402, filed Nov. 20, 2013, Techniques for Ascribing Social Attributes to Content.
"U.S. Appl. No. 13/303,812, Advisory Action mailed Aug. 22, 2016", 4 pgs.
"U.S. Appl. No. 13/303,812, Appeal Brief filed Dec. 9, 2016", 17 pgs.
"U.S. Appl. No. 13/303,812, Decision on Pre-Appeal Brief Request mailed Nov. 9, 2016", 2 pgs.
"U.S. Appl. No. 13/303,812, Pre-Appeal Brief Request filed Sep. 14, 2016", 6 pgs.
"U.S. Appl. No. 13/303,812, Response filed Aug. 15, 2016 to Final Office Action mailed Jun. 14, 2016", 12 pgs.
"U.S. Appl. No. 14/967,030, Examiner Interview Summary mailed Sep. 13, 2016", 3 pgs.
"U.S. Appl. No. 14/967,030, Examiner Interview Summary mailed Nov. 25, 2016", 3 pgs.
"U.S. Appl. No. 14/967,030, Final Office Action mailed Aug. 10, 2016", 18 pgs.
"U.S. Appl. No. 14/967,030, Non Final Office Action mailed Sep. 30,2016", 18 pgs.
"U.S. Appl. No. 14/967,030, Response filed Sep. 8, 2016 to Final Office Action mailed Aug. 10, 2016", 11 pgs.
"U.S. Appl. No. 14/967,030, Response filed Dec. 20, 2016 to Non Final Office Action mailed Sep. 30, 2016", 10 pgs.

* cited by examiner

SEGMENTATION OF PROFESSIONAL NETWORK UPDATE DATA

CROSS-REFERENCE TO RELATED PATENT DOCUMENTS

This patent application is a continuation of U.S. patent application Ser. No. 13/303,812, filed Nov. 23, 2011, which claims a priority benefit to U.S. Provisional Patent Application No. 61/416,722, entitled "SEGMENTATION OF PROFESSIONAL NETWORK UPDATE DATA," filed on Nov. 23, 2010, which is incorporated herein by reference in its entirety.

TECHNICAL FIELD

This patent document pertains generally to data processing, and more particularly, but not by way of limitation, to a system of segmentation of professional network update data.

BACKGROUND

A typical user may expect that with browser access to the Internet they may be able to readily access a large number of articles that will be of interest to them. This expectation is often not realized due to the large number of sources of articles and the basis for searching available to the user through a typical Internet browser. The relative few keywords the user enters as search terms have a low likelihood of matching an article with a high level of relevance to the user's interests. The direct search and match of articles based on keyword searches and content-based matching has little ability to present a good description of interests to the search, let alone lead to meaningfully matching their interests with the content of a large number of articles.

As a result of conventional content-based browsing for articles, the user may find that even with initiating a large number of searches that return a significant number of responses, the user may still end up with results that do not contain the high level of interest expected. The user may be left with their ability to quickly scan large numbers of articles and numerous iterations of keyword entry to the search to have hope in finding a reasonable selection of articles having interest to them. The browser-initiated keyword search does not convey any in-depth understanding of the user's interest let alone have the ability to match an article's contents with a relevant assessment of content meaning. As such, the conventional browser-based Internet search may be a drawn out hit-or-miss process.

BRIEF DESCRIPTION OF DRAWINGS

Some embodiments are illustrated by way of example and not limitation in the figures of the accompanying drawings in which.

DETAILED DESCRIPTION

Figure 1:
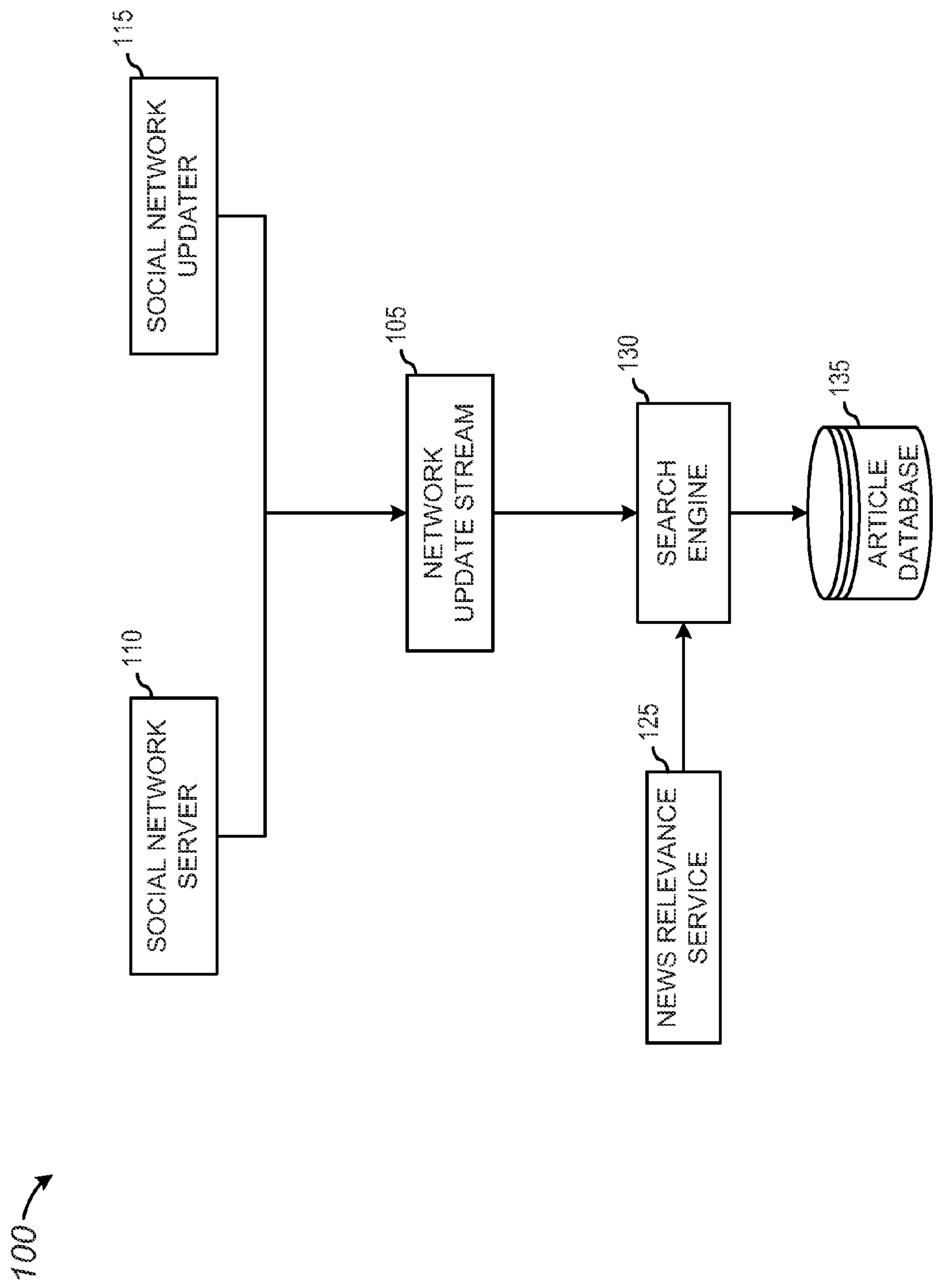
FIG. 1 is a block diagram illustrating a network update news environment, according to some example embodiments.

In the following description, for purposes of explanation, numerous specific details are set forth in order to provide a thorough understanding of some example embodiments. It will be evident, however, to one skilled in the art that the present invention may be practiced without these specific details.

Environment

The Internet provides a large number of news sources that a user may utilize in acquiring articles they may anticipate are of interest to them. Typically a user will do a broad-based search of a subject by employing an online browser or perhaps search at a particular online source for articles. A user's search may include keywords they expect will match an article title or article content. A user's match of the article content is typically based on some sort of scanning of articles by a searching agent included in the online browser or a searching mechanism hosted by the article's sourcing site.

After conducting a broad-based online search, the user typically has a complete article title and perhaps knowledge of the associated sourcing site responding with the article to determine an initial assessment of the relevance of the article. The user may then have to rely on their scanning abilities to quickly assess the relevance of the article and determine their interest in reading further. This process may have to be repeated many times before an article with the desired relevance to the user is found.

The user faces a significant challenge in optimizing the match of interesting and informative article content to their interests given the large number of the article sources and the nature of the search. A keyword search generally has a low likelihood of optimizing the relevance of an article content-based on a brief set of search terms and a lack of control over the searching agent.

The user may be able to engage in online news services where they may enter keywords as search terms. Conventionally, a news service might present articles to a user based on a match between the keywords the user entered and the characteristics of the content of a given article. This process provides a straightforward correlation between a substance of a news article and characteristics entered by the user. Although direct and basic, the article content approach for correlation lacks any capability for the user to find articles known to be of interest to other users with similar backgrounds. This project is also subject to the ability of the user to formulate keywords that will accurately match articles with content of interest to them. This may be a significant drawback for an effective way of finding interesting articles. For example, a search for articles by matching article content does not even begin to allow the user to select from a collection of articles known to have been read and liked by users with similar interests.

System

A system for the segmentation of networking update data provides considerations beyond standard conventions for presenting an article to the user. Rather than looking at an article's content for ranking the suitability of presenting the article to the user, the article may be ranked by the system according to certain properties of the persons who have acted on the article. For example, the searching user may indicate at a networking site that they want to follow a certain category of articles. To do so, the user may register their interest in a category having a particular characteristic. For instance, the user may choose to follow a category describing users which have the Internet related characteristic (e.g. they work in the Internet industry). The system may use this information to retrieve articles that have received interaction from users who have the same Internet related characteristic.

FIG. 1 is a block diagram illustrating a network update news environment 100 including a network update stream (NUS) 105, according to some example embodiments. The NUS 105 is communicatively coupled to a social network server 110 and a social network updater 115. The NUS 105 is also communicatively coupled to a search engine 130. The search engine 130 is communicatively coupled to a news relevance service (NRS) 125 and an article database 135.

A user may register and login to a networking site having social networking facilities such as the social network server 110 or the social network updater 115. During the course of terminal sessions at the networking site, the user may navigate to news articles provided by various article sources such as the NRS 125, for example. The user may take an action with an article such as share the article (the sharing inherently including an associated universal resource locator [URL]), click on various links within the article, or present comments on the article. These selection actions, or equivalently activity information, are provided as selection action data in a stream to the NUS 105.

The selection action data are annotated with a summary of the article content and article metadata by the NUS 105. For example, a share action may be annotated with a title of the article, a summary of the article contents, and a summary of the user making the selection action (i.e., the share action). For instance, a work related industry of the user, as well as their location, and job title may be included in the stream information and annotated by the NUS 105 as metadata along with article. The annotated article data, including selection action data, may be provided by the NUS 105 to the search engine 130.

The search engine 130 is also provided with search terms corresponding to categories belonged to by article selecting users and industries selected by viewing users at any of a number of social networking sites on the Internet. The search engine retrieves identifiers and pointers to the articles selected by the selecting users, and in turn retrieves the actual articles from the NRS 125. The articles, along with the corresponding selection action data, are stored in the article database 135.

Accordingly, a user who chooses to follow a particular category may be confident that when articles are presented from the networking site, they rank high in popularity with persons belonging to the industry that the user has selected for following. For instance, the Internet category is so named because the main characteristic used to match and associate the user's interests with, is the Internet. By either selecting to follow the Internet industry or by indicating an interest in the Internet in a user's profile a user may be matched with articles having a high popularity with other users who are in the Internet industry.

An article retrieval system may take advantage of access to a large number of articles from the NUS 105, as well as, to a significant number of users at the networking site with their respective sets of user characteristics (e.g., the industry that they work in). By monitoring the articles selected by the users from the NUS 105 and associating a characteristic of these selecting users with a given selected article, a further user having expressed an interest in following the same industry or characteristic may be presented with the article. For example, the common characteristic may be, as indicated above, the category of an industry the user may have chosen to follow (e.g., Internet). The selection to follow a particular industry may be indicated in a selection by the user while browsing the networking site or in the user's profile.

Once selected by one of the other users, an article is placed in the article database 135 along with metadata such as the associated social gesture performed by the selecting user when selecting the article. Types of social gestures may be liking, sharing, saving, commenting, and voting. For example, at numerous web pages displaying articles, a share button may be presented that links to a networking site. The share button may be displayed prominently near the title of the article or in close proximity to a banner section of the article. After reading an article, the user may decide that the article would be of interest to other users at the networking site. By click-selecting the button the article will be linked to the social networking site for distribution to other users.

A facility for channeling, monitoring, and annotating articles and their associated events, known as the NUS 105, may interact with machine-readable content associated with each article. The machine-readable content keeps track of and reports activity performed on the respective article by other users. These activities may be the social gestures mentioned above. The social gestures may be known as metadata and stored along with the article in the article database 135. Other metadata maintained for each article may include an article ID, an article title, a source identifier, and a universal resource locator (URL) of the article's source. The source identifier may specify an indicator of where the article originated and may include the name of a publisher or the name of a website, for example.

Further metadata associated with the article and corresponding to the user performing the social gesture, is gathered and stored along with the article into the article database 135. For instance, a user ID, and user characteristics such as an industry, a name of a company the user works for, their skills, and a user's location may be stored along with the article.

Figure 2:
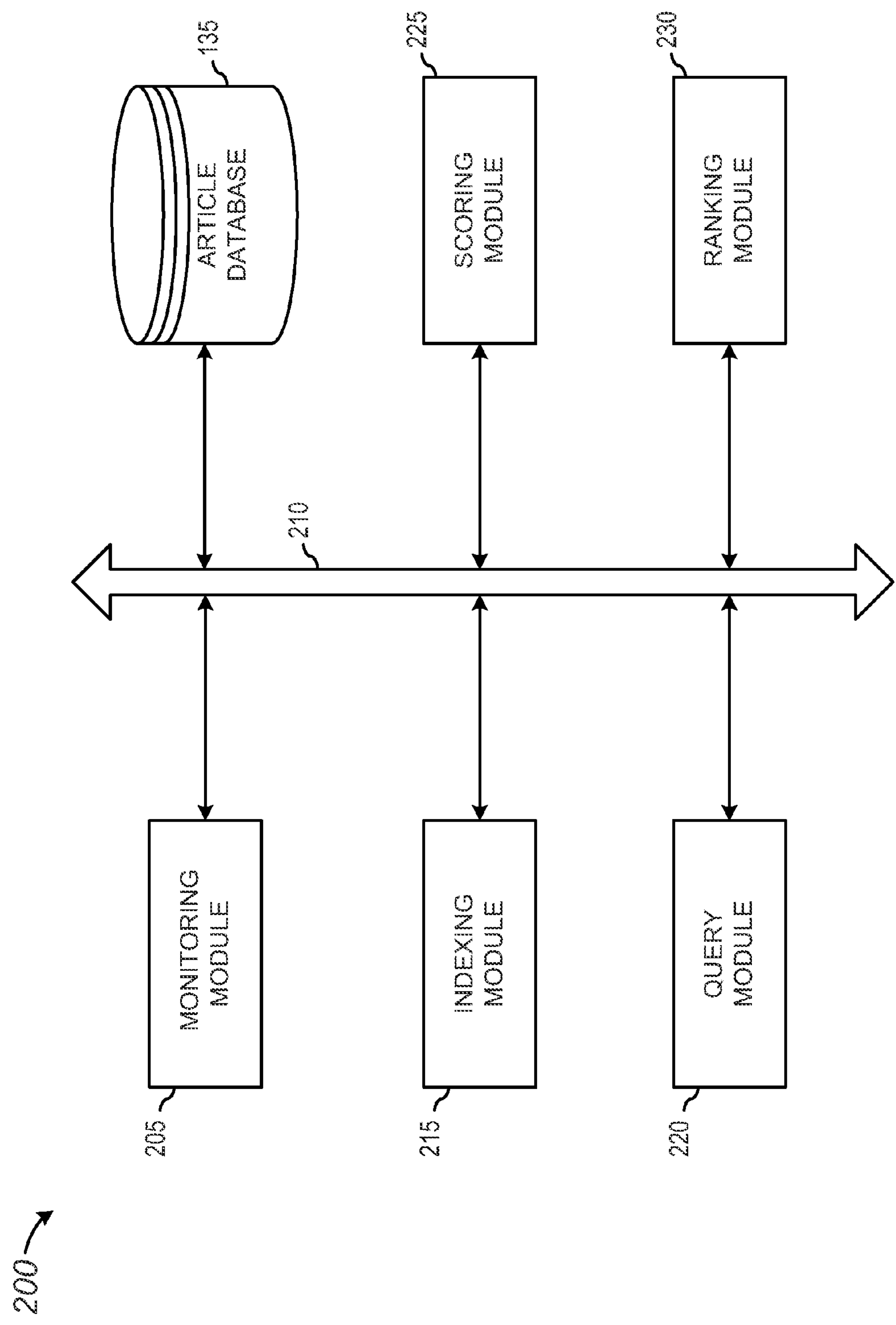
FIG. 2 is a block diagram illustrating a professional network update data segmenting system, as may be used in some example embodiments.

FIG. 2 is a block diagram illustrating a professional network update data segmenting system 200, as may be used in some example embodiments. A monitoring module 205 may be communicatively coupled through a network connection 210 to the social networking sites used by the user to find and read various news articles. The monitoring module 205 may also be communicatively coupled through the network connection 210 to the article database 135 (FIG. 1). An indexing module 215 and a query module 220 may be communicatively coupled to the networking connection 210.

Additionally, a scoring module 225 and a ranking module 230 may be communicatively coupled through the network connection 210 to the article database 135.

In some example embodiments, the professional network update data segmenting system 200 may be configured as a general-purpose processing device and implemented with a single processor or multiple processors to implement any of the capabilities, methods, and modules described herein. In yet some further example embodiments, the professional network update data segmenting system 200 may be implemented with a special-purpose processing device configured to implement the methods and have the capabilities described herein. Configuration of the professional network update data segmenting system 200 may be accomplished by a set of instructions embodied on a computer-readable storage medium that when executed by the general-purpose or special-purpose processing device implementing the professional network update data segmenting system 200, causes the processing device to perform the operations and implement the capabilities and methods described herein. For instance, the professional network update data segmenting system 200 implemented as a processing device such as the single processor, multiple processors, or the special-purpose device may be configured to execute the scoring function as part of the scoring module 225.

Once in the article database 135, all information related to the article is indexed by the indexing module 215 to aid in retrieval and ranking of the article. The database index is organized to facilitate retrieval of information by industry, time period, and user characteristics. Facets of other users selecting the article, as well as all metadata relating to the article, are included in a database indexing operation.

Queries may be initiated by the query module 220 to the database and utilize the index to retrieve a list of articles associated with a certain set of characteristics (or facets). Queries may be initiated with query terms relating to the characteristics or facets associated with other users interacting with an article rather than with keywords, as are typically used in conventional article content queries. The characteristics associated with the article may be the same as the metadata stored with the article or may be derived quantities based on associations and extrapolations of certain characteristics of the metadata. The list of articles may in turn be applied to the scoring function performed by the scoring module 225 to generate a score used by the ranking module 230 to rank the article within a category.

The particular industry characteristic the associated users belong to at the time of an article's selection may be a primary characteristic used for queries of the index of articles in the database according to some example embodiments. Queries return a list of articles which may include, for each article, the users who have performed an associated social gesture and the particular gesture or gestures they have performed on the article. A typical query performed by the query module 220 may include a time period search term which may be used in further resolving the list of articles returned.

For instance, according to some example embodiments, a query may include a query term naming an industry and particular time period. The query may return information including a list of articles and the members who have acted on the article by selecting the article, the selection action taken by each user, and a time period within which the selection was performed on the article. The returned information may also include the type of social gesture performed and the associated industry. For instance, according to some example embodiments, a query including a query term "Internet" and query time period of "last day" may return a list of articles in which all the users who have interacted with articles relating to the Internet have done so in the past day.

Articles pertaining to an industry category are set up and configured in the database by a "return service," which in some example embodiments may be the NRS 125. Focus around a particular following of an industry may be referred to as a slice. Followed slices may be an industry slice, a publisher slice, and a company slice, for example. A request to the NRS 125 may be thought of as a request to get and return articles for specified followed slices, where the slices are entered by name as arguments to the request.

Requests to the NRS 125 may return combined ranking and individual rankings from the activity search index (i.e., database). Since entries in the database change continuously and rapidly, a cache is maintained that incorporates the most recently transacted article entries associated with the database. For instance, when a ranking is updated, the cache, which includes a list of industries the article is popular in, is updated as well. Additionally, the article's metadata corresponding to the related industry is updated. Industry related rankings, based on popularity, are updated according to a schedule. The rankings determine whether an article continues to be presented within the associated industry category or is withdrawn. When a ranking or popularity score is not available in the cache (i.e., a cache miss), the NRS is searched directly.

Once in the database, a scoring function may be periodically run on the article to produce a score indicating the level of popularity of the article. Scores used for ranking come from the NRS 125 which may facilitate the scoring module 225 and perform the scoring function. Articles are periodically retrieved from the query module 220 by a query (similar to those described above) and provided to the scoring function to have a popularity score determined. According to the popularity score the article may be prospectively ranked for presentation to the user in their next terminal session at the networking site. An article ranks among other articles of the same characteristic according to the popularity score received. Thus, articles having higher rankings but the same characteristic, may appear earlier within a presentation to the user at the networking site.

In determining the relevance of the article for a user, consideration is given within the scoring function to how often the article is selected by other users and in what sort of Internet context the selections have occurred. For instance, if an article is being shared generally and globally across the Internet by a large number of other users, that article is not as likely to be useful to the user as compared to an article that has been selected far fewer times, yet has been selected by other users belonging to the industry that the user has chosen to follow.

The recency with which other users have selected the article is also given a high influence on the score used in ranking. The article more recently selected by other users is likely to have a greater relevance to the user than another article which has been selected a significant amount of time in the past. Accordingly, the scoring function may place a more positive weight on the number of people who have interacted with the article in the last few days or last few hours than on an article receiving interaction by other users several weeks ago. Additionally, the scoring function may place a negative weight on a relatively high amount of global interactions of users with the article. These types of considerations may be desired in the scoring function since a relative sense of uniqueness of presented articles is desired, especially within an industry selected for following by the user.

Determining the recency factor in selected articles may be facilitated by the notion of using time buckets for resolving the occurrences of actions taken on the article. A time bucket is a specified period of time which is selected to establish a reasonable resolution in measuring when a user interaction has occurred. For instance, a time bucket of one minute is sufficient to resolve occurrences of actions towards most articles on the Internet. Additional selection of time buckets of one hour or one day may be sufficient to resolve occurrences of actions towards most articles in resolving general trends in popularity. Once selected, the time bucket magnitude is used to resolve the occurrence, up to the magnitude of the time bucket, of a selection action on the article. In other words a selection occurring anywhere within the time bucket is sufficiently represented as occurring within the time bucket. Where in the time bucket the action occurred is not important. By chaining together multiple time buckets a baseline measurement system may be established that provides sufficient resolution for supplying a weighting function, for instance, which may be used in supplying the scoring function.

In some example embodiments, the scoring function may be calculated according to the expression:

$$\text{Score}=\Sigma_{i=1}^{n} W_i \log_e(m(t_i)+c_i),$$

where $t_i$ is the $i^{th}$ query term posed to the database, m is the number of members corresponding to a particular article returned according to the $i^{th}$ query term, $c_i$ is a smoothing constant which may vary by the associated query term, and $w_i$ is a weighting factor set per global activity (i.e., per social gesture associated with the $i^{th}$ query term).

The smoothing constant, $c_i$, may be set to a relatively high value when the $i^{th}$ query term posed to the database is a global activity. This may be done to distinguish the likelihood that small differences in the global activity are less important than small variations in an industry specific activity. This type of smoothing process ensures that novel and interesting articles are supplied to the user and that global activity among articles does not swamp out the focus on more localized industry specific articles.

The logarithm calculation of the $i^{th}$ query term may be weighted by setting a magnitude of $w_i$ according to the corresponding global activity. Global activity weighting functions may correspond to each of the social gestures described above. According to some example embodiments, the global activity of sharing would have a higher weight than a global activity of reading. The actual weighting factor may be set according to the desired importance of each corresponding social gesture. The sum of this calculation is taken across the entirety of query terms submitted to the article database 135 corresponding to the particular selected industry. The calculation is taken this way in order to produce a corresponding score for that industry.

According to some example embodiments, the scoring function may normalize scores based on how globally popular an article is. For instance when general and globally occurring articles with a high popularity score are desired for consideration side-by-side with selected articles from a user-selected industry, a process for normalizing the two types of articles is desired. A term in the denominator of the scoring function may be included to accommodate the large number of other users selecting articles globally which may better provide a normalized comparison with industry-specific selected articles.

Once scored, select articles may be ranked according to their score. According to some example embodiments, the ranking is done in descending order from the highest-ranking selected article to lower ranking articles. A previously determined number of articles may be prospectively established for presentation to the user at their next terminal session at the networking website. The previously determined number of articles is established by a typical number of articles that may reasonably be displayed on a webpage and maybe the number of articles a user is generally considered likely to act upon.

During the course of presenting articles from various sources it may become clear that certain publishers tend to produce articles that are generally preferred by users. A listing of publishers producing preferred articles may be maintained according to respective industries in a preferred publishers list or a "white list." as the term may be known in some example embodiments. Articles may be preferentially selected from sources maintained by the preferred publishers and ranked higher in order to increase the overall quality of article coverage for any respective industry. In response to the preferential selection of articles from these sources, selected articles may be spread out within a presentation to avoid a perception of favoritism or dominance of the presentation by a single or a relative few sources. The spreading out of articles from a single source is done after the scoring function is performed on the respective articles.

In displaying articles there may be a tendency to present articles from a list of related articles. However, this may lead to duplication in the presentation of articles, which may be annoying to the user and reflect poorly on the networking site. In order to avoid this, articles may be clustered by content. Generally this is the only time that content of the article is considered. In order to avoid the duplication of articles problem, only the top articles from each cluster are presented.

Interfaces

Figure 3:
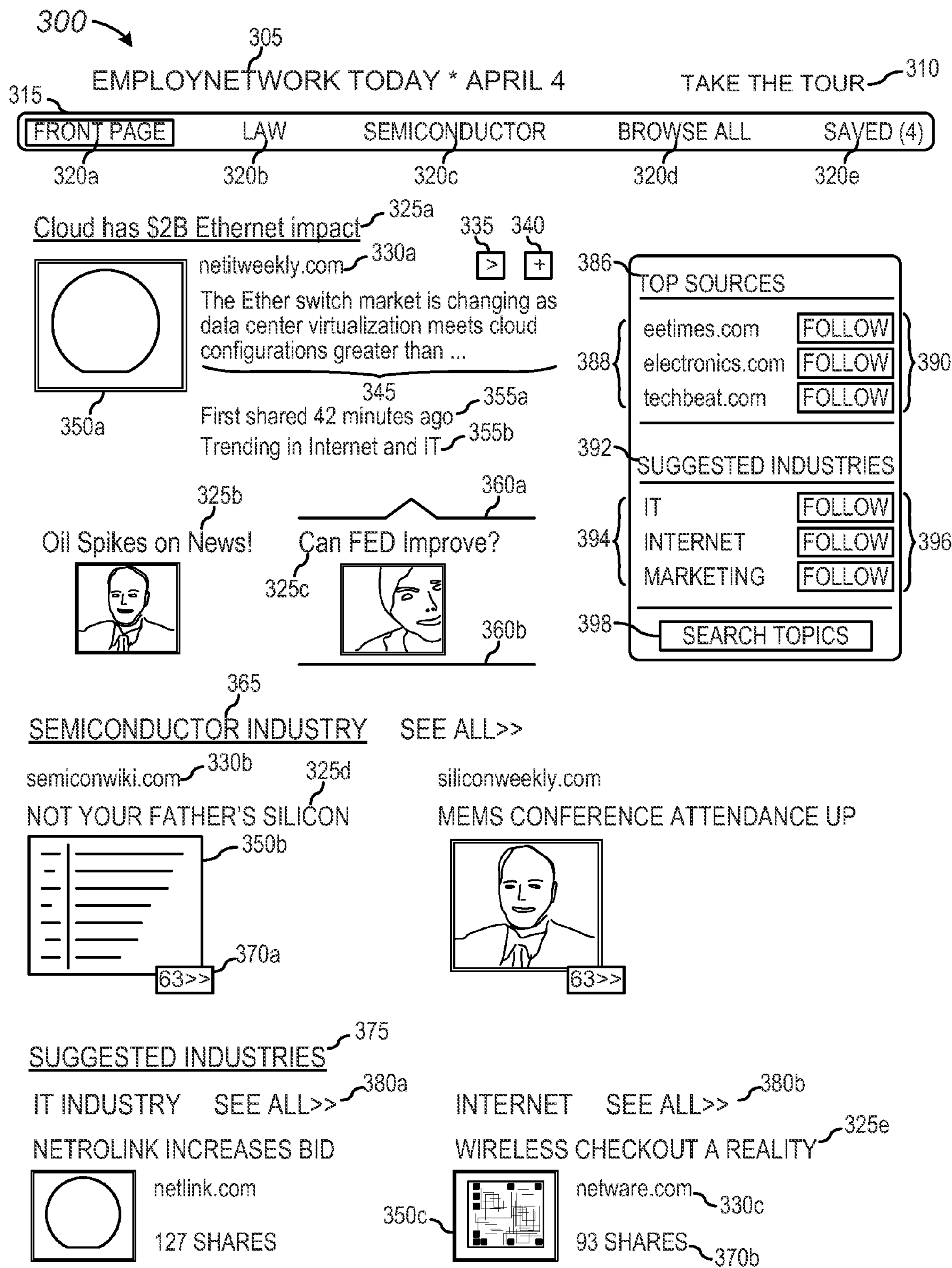
FIG. 3 is a diagrammatic representation of a network update news home landing page, as may be used in some example embodiments.

FIG. 3 is a diagrammatic representation of a home landing page 300 displaying network update news, as may be used in some example embodiments. When a user logs into the segmentation system website they may be presented with a networking site banner 305 on the home landing page 300. The networking site banner 305 may include the current date that the home landing page 300 is being viewed on. A Take the Tour link 310 may be a selectable link to a website navigation wizard that may provide website insights presented through a guided tour wizard.

The home landing page 300 may also feature a menu bar 315 which may include menu selections 320*a*-320*e*. The menu selections 320*a*-320*e* may include links to a Front Page 320*a* (e.g., the home landing page 300), a selection of links to followed categories (e.g., Law 320*b* and Semiconductor 320*c*), a link to a follow selections pop-up window 320*d*, and a link to a saved article window 320*e*, according to some example embodiments. Each of the menu selections 320*a*-320*e* may be a clickable link to a respective webpage, category, or networking site resource, each of which is described in further detail below.

The display of articles in various categories is generally synthesized from across all categories the user has chosen to follow. An upper portion of the page may be devoted to presentation of titles of trending articles 325*b*and 325*c* which are top articles in popularity across the Internet. The trending articles category consists of articles that are popular to a general audience across the Internet. Trending data and corresponding scores for ranking come from the NRS. When an article has demonstrated a significant level of popularity in multiple industries the article is considered to be part of a trending articles category. For example, an article may be trending in both an Internet category and an IT category, e.g., the trending indicator 355*b* and therefore may be considered to be a trending article.

A featured trending article 325*a* may include a source link 330*a* as well as a share link 335 and a save link 340. The source link 330*a* may be a user-selectable link to a webpage of the source of the featured trending article 325*a*. The share link 335 and the save link 340 may be user-selectable links for the viewing user to make article selections and register respective selection action data corresponding to the featured trending article 325*a*. The featured trending article 325*a* may also include a text snippet 345 and a lead-in graphic 350*a*. The text snippet 345 and the lead-in graphic 350*a* provide a brief indication of the content and substance of the featured trending article 325*a* and may provide an enticement for the viewing user to click-through to the article itself.

Share and trending indicators 355*a*-355*b* may also be presented with the featured trending article 325*a* to present a perspective on recency and the categories the featured trending article 325*a* is based on. The featured trending article 325*a* may be presented as a user selection from among further trending articles 325*b*-325*c* according to a selection gadget 360*a*-360*b*. By hovering over one of the further trending articles 325*b*-325*c* with the selection gadget 360*a*-360*b*, the user may select the next trending article to be displayed as the featured trending article 325*a*.

To determine trending article status the article may have been returned from the database according to queries applied to more than one industry and then applied to the scoring function. The industries supplied in the query may be influenced by the industries chosen to be followed by the user. Yet, the user, may not have direct control over the trending articles displayed at the webpage. If, after application to the scoring function, the article's popularity exceeds a trending threshold in more than one industry the article may be presented in the trending articles pane.

In the trending article category the popularity score is determined primarily on the number of users acting on the article. The trending threshold is a minimum number of users that are required to have interacted with the article to satisfy a predetermined popularity requirement. For example, the number of actions associated with an article may have to exceed the trending threshold in order for the article to be displayed in the trending article category.

A next portion of the home landing page 300 may be devoted to presentation of articles relating to followed industries. These are industries that have been selected by the user to be followed. The followed industries presentation at the segmentation system website is a display of articles meeting a minimum popularity threshold and that have been interacted with by other users who belong to the industry that the viewing user may have selected to follow. Due to the high level of popularity for qualifying articles, their content is known to be popular with other users whose interests have caused them to choose the selected industry. A globally popular article may be presented within the selected industry section. This may be the case when the number of following indications by the other users is relatively high.

A followed industries indicator 365 may be displayed at an initial portion of the followed industries section. A source link 330*b* and title of a followed article 325*d* may be displayed in a most prominent portion of the followed industries section for a most popular article in one of the user's selected categories. The most popular article may also include a lead-in graphic 350*b* and a sharing indicator link 370*a*. As with the featured trending article 325*a* described above, the lead-in graphic 350*b* may give a brief indication of the content of the followed article 325*d* and may provide an enticement for the viewing user to click-through to the article itself. The sharing indicator link 370*a* may be a user-selectable link that on selection, navigates the viewing user to a shared articles pop-up window discussed below.

The user may also select to follow a particular website as a source to receive articles from. In this situation the scoring of articles and their eventual ranking is based on a count of users and their actions with articles at the website. This differs from the ranking in the selected industries where the characteristics of users who interacted with the article are considered in the ranking. With a basis in global popularity, the sheer number of users' actions towards the articles at the website constitutes the main input for determining the ranking of articles from the particular website.

A further portion of the segmentation system website may be devoted to presentation of articles from suggested industries. The segmentation system may perform a number of algorithms and calculations that consider a user's profile, industries selected by the user to follow, and long-term article selection history to determine articles being selected by other users from the current networking update stream that are likely to be of interest to the user. These articles are ranked according to their highest correspondence to the expected interest of the user and displayed accordingly in a suggested industries section 375 of the webpage.

The suggested industries section 375 may provide several suggested industry categories 380*a*, 380*b* for the viewing user to select from. A suggested industry article 325*e* may be presented along with a source link 330*c* and a sharing indicator link 370*b*. The source link 330*c* may be a user-selectable link to a webpage of the source of the suggested industry article 325*e*. The sharing indicator link 370*b* may be a further user-selectable link, that on selection, navigates the viewing user to a shared articles pop-up window discussed below.

In yet a further portion of the home landing page 300 a top sources section 386 and a suggested industries section 392 may be presented. The top sources section 386 may include a set of top source links 388 corresponding to the most popular articles. The top source links 388 may be presented as user-selectable links which when selected, navigate directly to a main landing page at a website corresponding to the respective source. A set of top source follow links 390 may be presented as user-selectable links to engage a corresponding source as a followed category by the viewing user.

The suggested industries section 392 may include a set of suggested industry links 394 which may be displayed as user-selectable category links to the most likely industries to be of interest to the viewing user. The suggested industry links may presented as user-selectable links which when selected, navigate directly to a further webpage at the networking site corresponding to the respective industry and be displayed as a followed category. A set of suggested industry follow links 396 may be presented as user-selectable links to engage a corresponding industry as a followed category by the viewing user. A search topics link 398 may also be displayed adjacent to the top sources section 386 and the suggested industries section 392 as an aid to the user for potentially finding further topics to follow.

Additionally, pictures of individuals (not shown) may appear in close proximity to any of the previously described article presentations at the home landing page 300. For example, there may be pictures of other users related with the viewing user according to certain connections within the user's network. The other users shown may be in a user's first or second degree network or may be users who are connected to the user's connections. The users' pictures are of people who have publicly taken action on a related article (e.g., generally shared or liked the article for instance). The viewing user may hover their cursor over these pictures and correspondingly see a short profile about the user. The picture of the individual may also be presented as a user-selectable link that when selected, navigates directly to the profile of the picture user.

According to some example embodiments, there may be a byline beneath the article that gives an indication of why the article is being presented. For instance, the indication may be "because three of your connections shared this." Some further example embodiments may have comments by members of the user's network featured in a position like that of the byline. This information is intended to give a personalized context to the articles in the suggested industries presentation.

Figure 4:
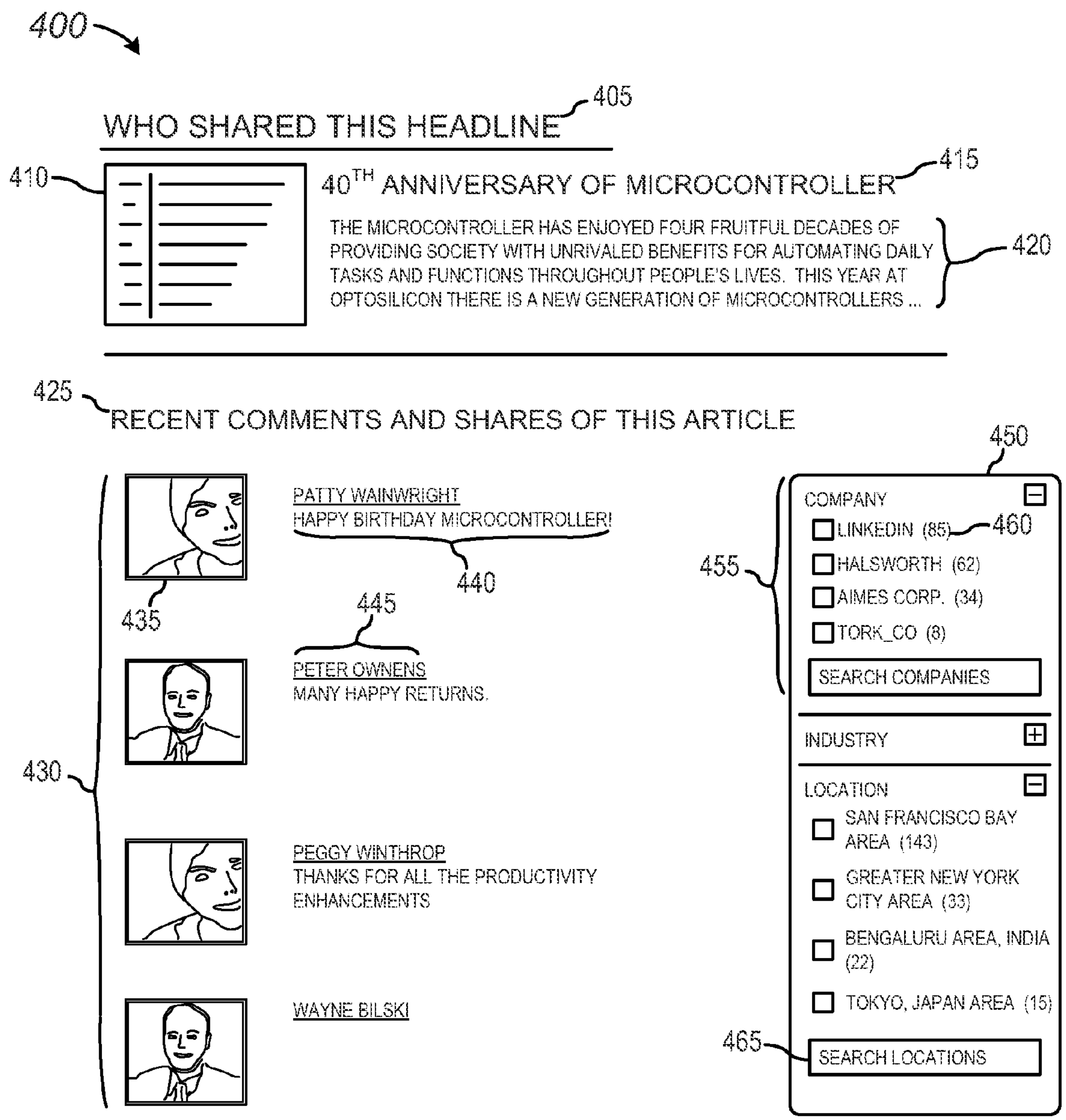
FIG. 4 is a diagrammatic representation of a shared articles pop-up window, according to some example embodiments.

FIG. 4 is a diagrammatic representation of a shared articles pop-up window 400 which may be displayed after selection by a user of any of the sharing indicator links 370*a*-370*b* presented at the home landing page 300 or several other web pages (discussed below) at the networking site. A sharing headline banner 405 may be displayed in an upper portion of the shared articles pop-up window 400. A lead-in graphic 410, a title of the trending article 415 selected by the user, and text snippet 420 may be presented immediately beneath the sharing headline banner 405. In a recent comments section 425 of the shared articles pop-up window 400 a set of sharing users 430 may be presented along with links to their profiles. Additionally, their comments 440 about the shared article may also be displayed when provided by the respective one of the sharing user 430. Each sharing user 430 may correspondingly have a personal picture 435 displayed which may also be a user-selectable link to their profile. Each sharing user 430 may have their user name 445 displayed as a further user-selectable link to their profile.

A further portion of the shared articles pop-up window 400 may present a facet filter selection pane 450 that includes category selections that may be applied to filtering the display of sharing users 430. For each category a set of facet filter selections 455 may be presented. Each individual facet filter selection 460 may correspond to a particular filter facet associated with the corresponding category. By selection of a check box, a user may activate a particular facet filter selection 460 and thereby restrict the display of sharing users 430 to those users having a characteristic corresponding to the selection. For any one of the categories displayed in facet filter selection pane 450 a search pane 465 may be presented. By entering a search term in the search pane 465, a user may initiate a search for a further facet filter selection 460 that may be of interest to the user but not have been previously displayed.

Figure 5:
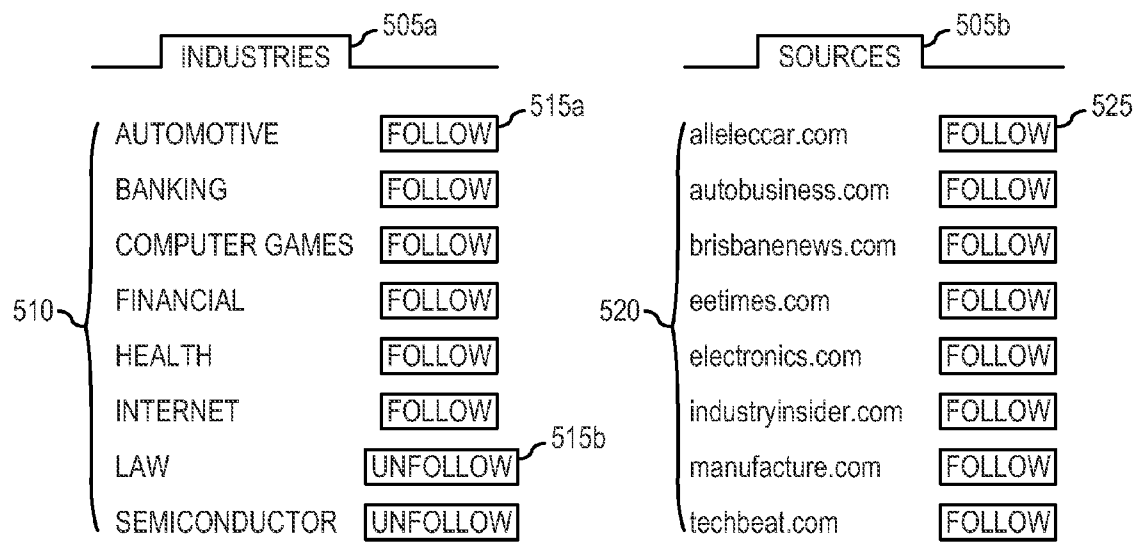
FIG. 5 is a diagrammatic representation of a follow selection pop-up window, according to some example embodiments.

FIG. 5 is a diagrammatic representation of a follow selection pop-up window 500 according to some sample embodiments. The follow selection pop-up window 500 may be initiated by a click of the user-selectable link to a follow selections pop-up window 320*d* (FIG. 3). The user may select this link to be connected to the selections pop-up window 320*d* (e.g., Browse All) and have access to all the selections of industries and sources available at the network, for example. Category headings 505*a*-505*b* corresponding to the categories such as industries and sources, may be presented as headings to listings of corresponding category selections. For example, a set of industry selections 510 may be presented along with corresponding user-selectable follow links 515*a*-515*b*. Additionally, a set of source selections 520 may also be presented along with a set of user-selectable follow links 525. By selecting the follow link 515*a* corresponding to the automotive industry, the user will thereafter be following the most popular articles from the automotive industry. Contrastingly, in selecting an unfollow link 515*b* corresponding to the semiconductor industry, the user will cease to follow the semiconductor industry for articles.

Figure 6:
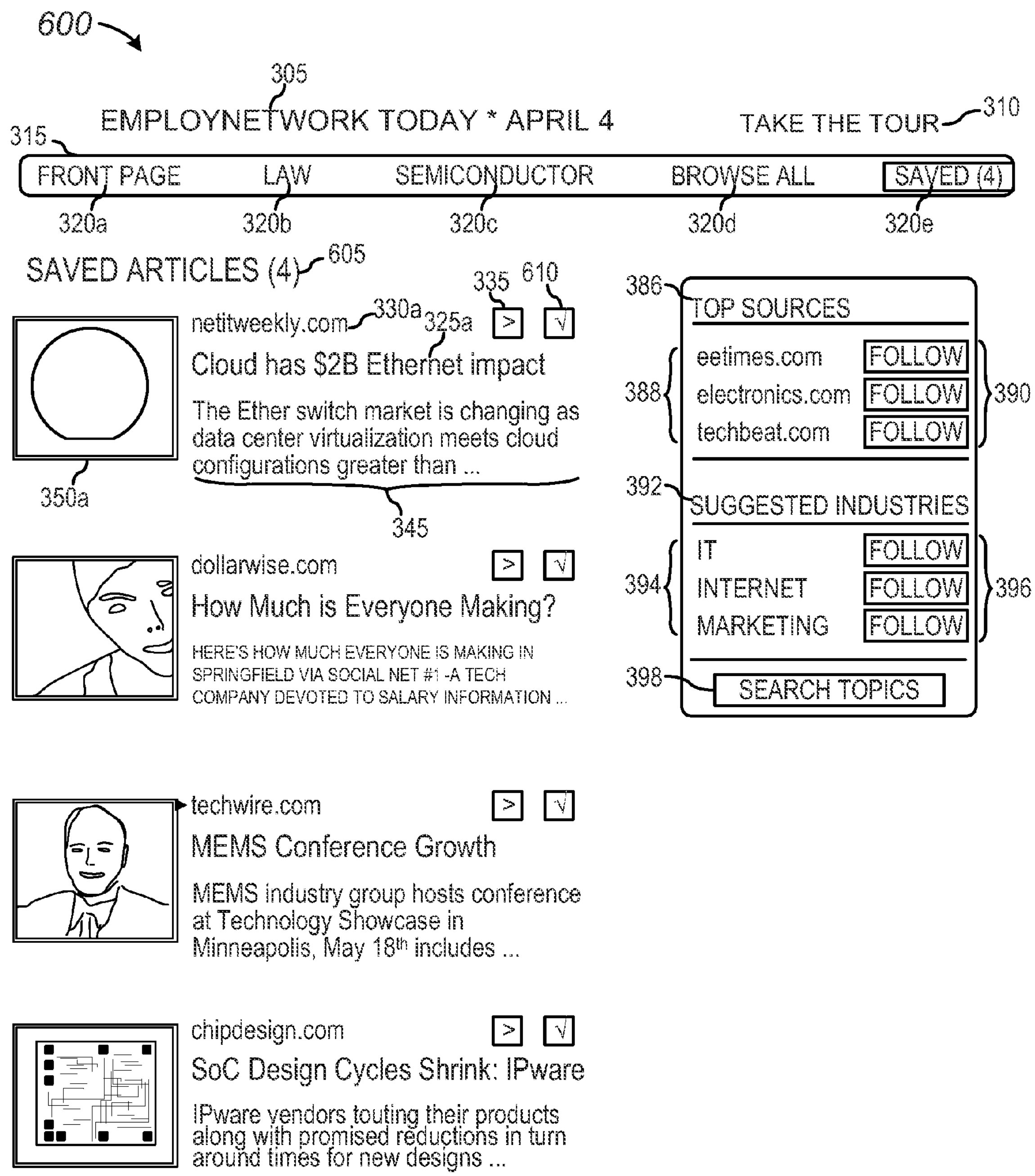
FIG. 6 is a diagrammatic representation of a saved article window, as may be used in some example embodiments.

FIG. 6 is a diagrammatic representation of a saved article window 600 according to some example embodiments. The saved article window 600 may be navigated to by selection of the saved article window 320*e* menu selection in the menu bar 315 as presented on the home landing page 300. Once at the saved article window 600, the networking site banner 305 and menu bar 315 (FIG. 3) including menu selections 320*a*-320*e* may be displayed. A saved articles banner 605, including an indication of the number of articles being saved through the web page, may appear above a set of article indicators. In a fashion similar to that used to display the featured trending article 325*a* (FIG. 3), the saved articles are displayed with the source link 330*a*, text snippet 345, and the lead-in graphic 350*a*. The share link 335 is displayed along with an unsave link 610. In this way, saved articles may still be shared with other users as well as removed from the saved article window 600.

In yet a further portion of the saved article window 600, the top sources section 386 and the suggested industries section 392, corresponding to the sections displayed on the home landing page 300 (FIG. 3) and described above, may be presented. The same sets of top source links 388, top source follow links 390, suggested industry links 394, and suggested industry follow links 396 may be presented as described above. The search topics link 398 may also be displayed adjacent to the top sources section 386 and the suggested industries section 392.

Figure 7:
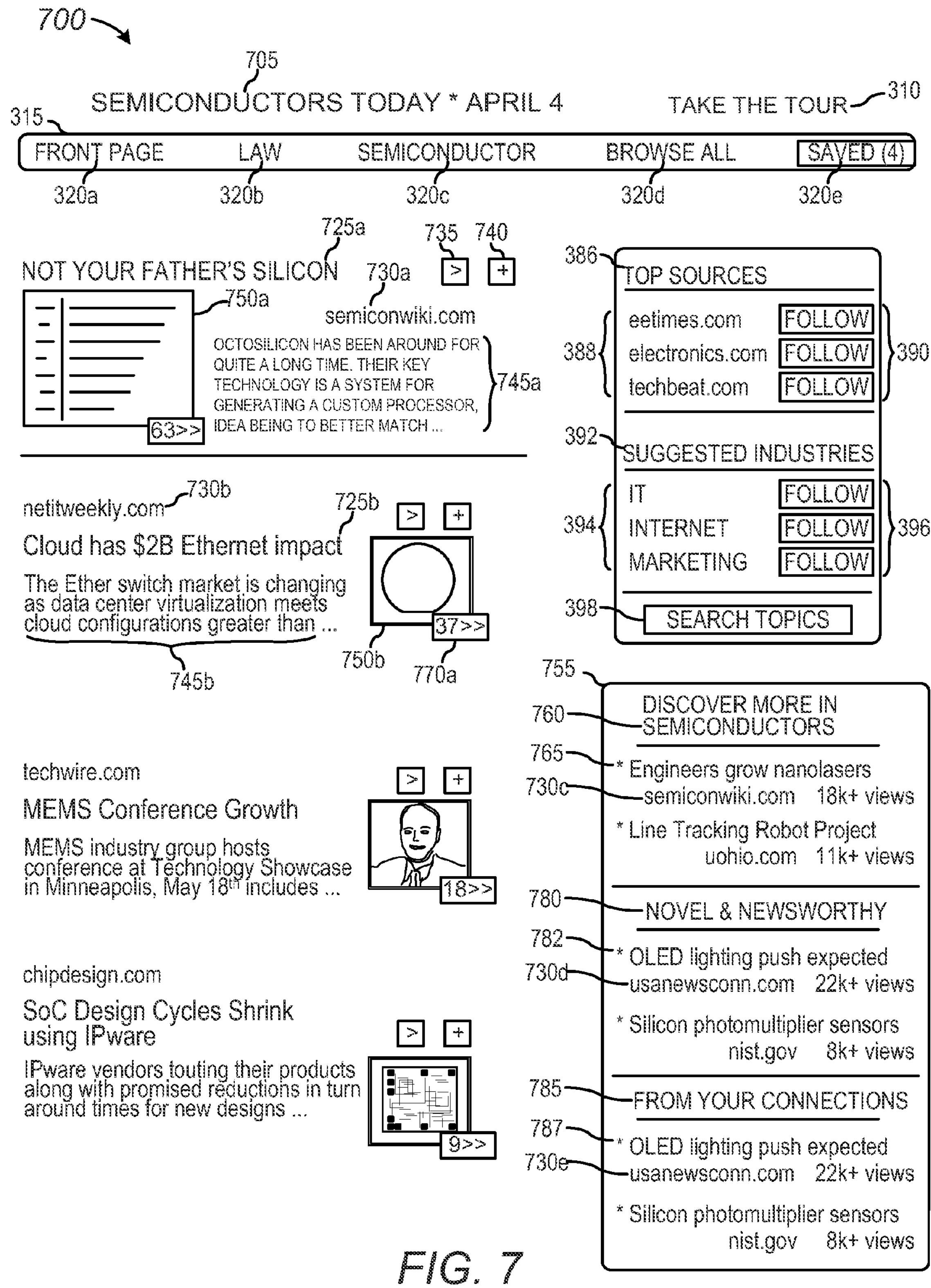
FIG. 7 is a diagrammatic representation of a followed category window, according to some example embodiments.

FIG. 7 is a diagrammatic representation of a followed category window 700 according to some example embodiments. The followed category window 700 may be navigated to by selection of the followed industries indicator 365 at the home landing page 300 or by picking the corresponding category menu selection 320*b*-320*c* (e.g., Semiconductor 320*c*) from the menu bar 315 as presented on the home landing page 300. Once at the followed category window 700, the networking site banner 305 and menu bar 315 (FIG. 3) including menu selections 320*a*-320*e* (and further elements described above) may be displayed as they were at the home landing page 300. A followed category banner 705, including an indication of the date, may appear above the menu bar 315.

In a fashion similar to that used to display the featured trending article 325*a* (FIG. 3), a featured followed article 725*a*, generally representative of the set of follow articles, is displayed along with a source link 730*a*, a text snippet 745*a*, and a lead-in graphic 750*a*. A share link 735 may be displayed along with a save link 740. A further followed article 725*b* may typically be displayed with a source link 730*b*, a text snippet 745*b*, a lead-in graphic 750*b*, and a sharing indicator link 770*a*.

In a further portion of the followed category window 700, a suggestions pane 755 may be displayed and include a discover-more banner 760. A further source link 730*c* corresponding to the discover suggestion article 765 may also be displayed under the discover-more banner 760. A novel and newsworthy banner 780 may also be displayed in the suggestions pane 755 and include a novel and newsworthy suggestion article 782. Yet a further source link 730*d* corresponding to the novel and newsworthy suggestion article 782 may also be displayed under the novel and newsworthy banner 780. The suggestions pane 755 may also include a connections banner 785 and include a connections suggestion article 787. A further source link 730*e* corresponding to the connections suggestion article 787 may also be displayed under the connections banner 785. The discover-more banner 760, the novel and newsworthy banner 780, and the connections banner 785 may be presented to the user to provide further alternatives in the followed category, the news in general, and from the user's connections respectively.

In yet a further portion of the followed category window 700, the top sources section 386 and the suggested industries section 392, corresponding to the sections displayed on the home landing page 300 (FIG. 3) and described above, may be presented. The same sets of top source links 388, top source follow links 390, suggested industry links 394, and suggested industry follow links 396 may be presented as described above. The search topics link 398 may also be displayed adjacent to the top sources section 386 and the suggested industries section 392.

Methods

Figure 8:
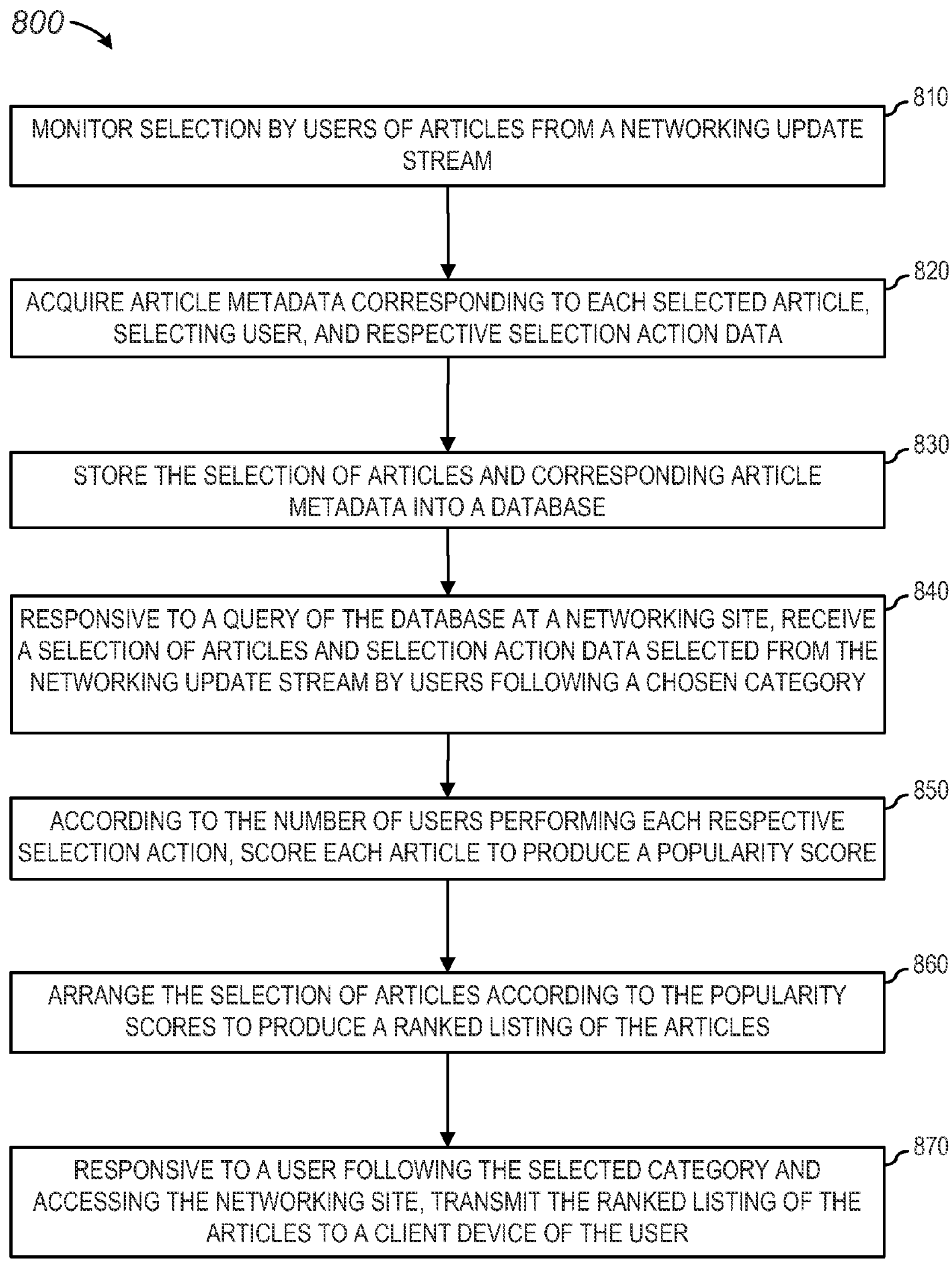
FIG. 8 is a flow chart illustrating a method to provide a ranked listing to a client device, according to some example embodiments.

FIG. 8 is a flow chart illustrating a method to provide a ranked listing of articles 800 to a client device according to some example embodiments. The method commences with monitoring 810 selections by the users of articles from the networking update stream 105. The articles may have come from either the social network server 110 or the social network update 115 and may be selections the users made by liking, sharing, saving, commenting, and voting on the articles, for example. The method continues with acquiring 820 article metadata corresponding to each selected article, selecting user, and respective selection action data. The method goes on with storing 830 the selection of articles and corresponding article metadata into the article database 135.

In response to the query of the article database 135 at a networking site, the method continues with receiving 840 a selection of articles and selection action data selected from the networking update stream 105 by the users having chosen to follow a particular category such as Semiconductor 320*c* (FIG. 3). According to the number of users initiating each respective selection action, the method goes on with scoring 850 each article to produce a popularity score. The method continues with arranging 860 the selection of articles according to the popularity scores to produce a ranked listing of the articles. In response to a user accessing the networking site and also having chosen to follow the same category as the users, the method proceeds with transmitting 870 the ranked listing of the articles to a client device of the user.

Figure 9:
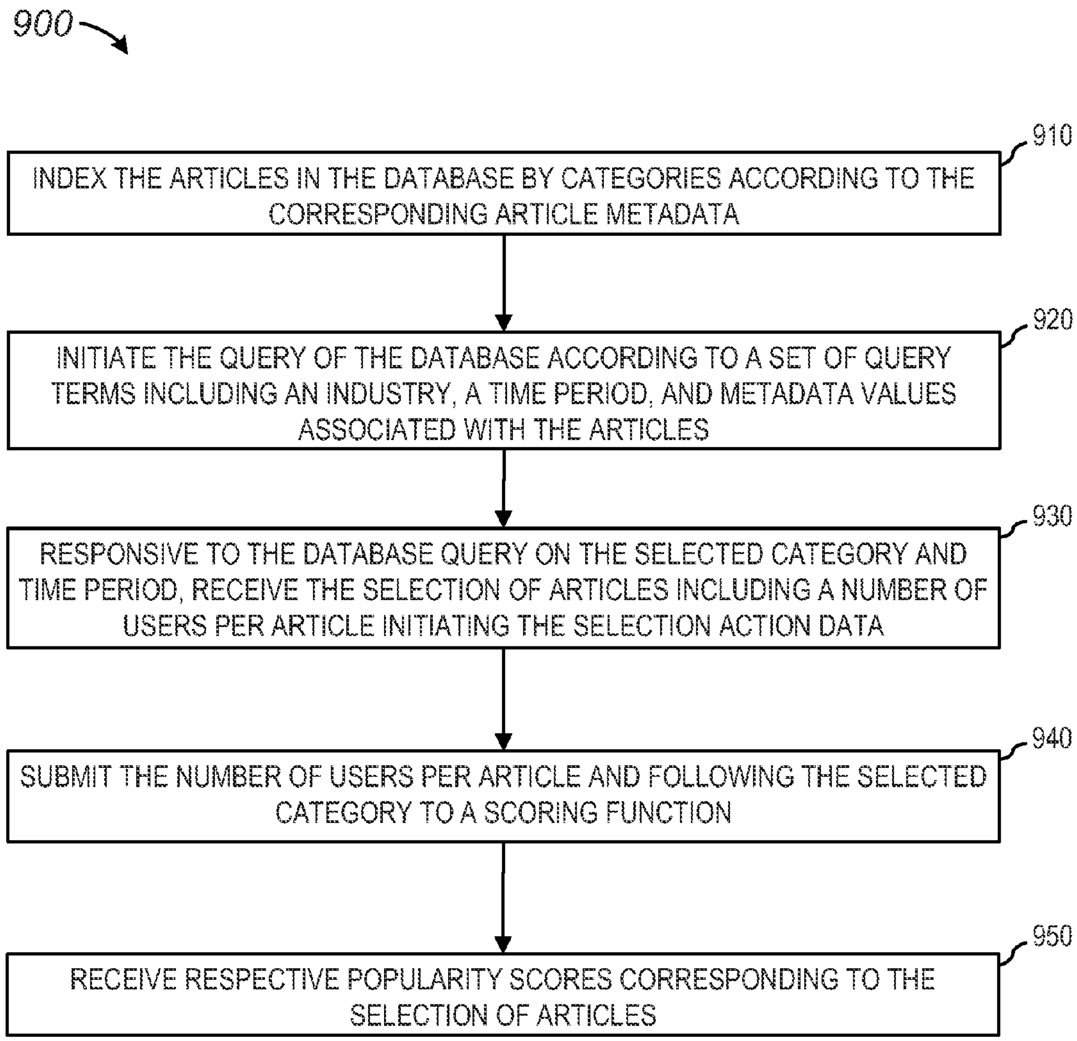
FIG. 9 is a flow chart illustrating a method to rank articles, according to some example embodiments.

FIG. 9 is a flow chart illustrating a method to rank articles according to some example embodiments. The method commences with indexing 910 the articles received from sources such as the NRS 125 and which reside in the article database 135 (FIG. 1). The articles are indexed into category headings according to the categories themselves and corresponding article metadata. The method proceeds with initiating 920 the query of the article database 135 according to a set of query terms including an industry, a time period, and metadata values associated with the articles. The metadata is information received from the social network server 110 and the social network updater 115 and which relates to the selection actions taken by the users when selecting the articles. In response to the database query on the followed category and time period, the method continues with receiving 930 the selection of articles including data about the number of users per article who initiated the selection action.

The method continues with submitting 940 the number of users per article following the followed category to the scoring function conducted in the scoring module 225 (FIG. 2). The count of the number of users per article may come directly from the metadata returned by the query. The method concludes by receiving 950 respective popularity scores corresponding to the selection of articles. The popularity scores received are in turn provided to the ranking module 230 (FIG. 2) for ranking in a particular order, which may typically be in descending order, for example.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Machine Architecture

Figure 10:
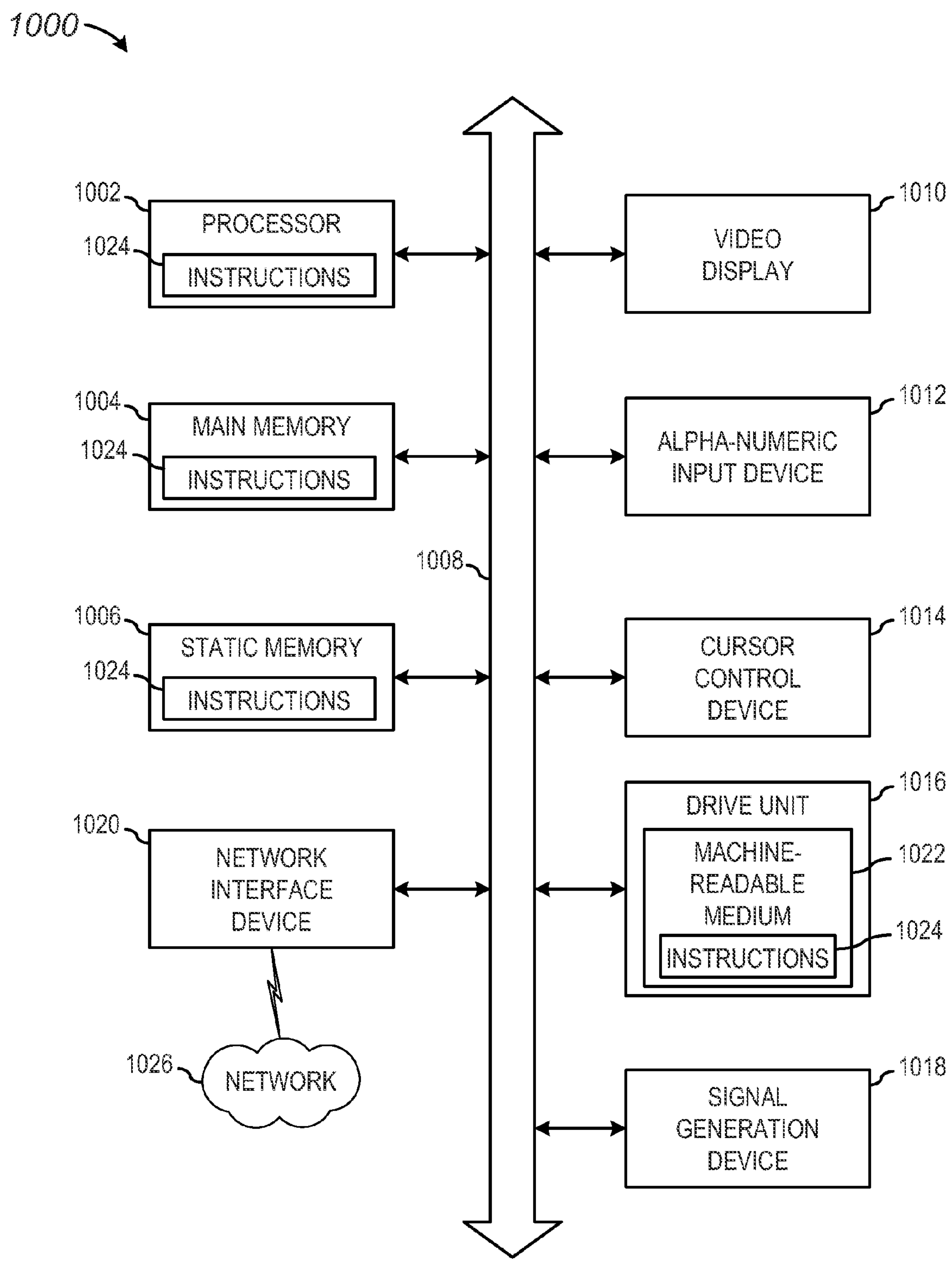
FIG. 10 is a block diagram of a machine in the example form of a computer system within which a set instructions, for causing the machine to perform any one or more of the methodologies discussed herein, may be executed.

FIG. 10 is a block diagram of machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices. e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Although the present invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

Plural instances may be provided for components, operations, or structures described herein as a single instance. Finally, boundaries between various components, operations, and data stores may be somewhat arbitrary, and particular operations may be illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:

determining a plurality of selections of a plurality of content items from a network update stream by a plurality of selecting users of a social network system, the determining of the plurality of selections based on a plurality of social gestures made by each selecting user of the plurality of selecting users with respect to the plurality of content items;

associating a plurality of characteristics of the plurality of selecting users with the plurality of content items, the associating including annotating the plurality of content items with metadata pertaining to the plurality of characteristics;

storing the plurality of content items and the plurality of characteristics in an article database that is indexed to facilitate retrieval of the plurality of content items from the database based on the plurality of characteristics;

receiving a search query from a searching user of the social network system, the search query specifying a value for one of the plurality of characteristics that includes an industry instead of keywords pertaining to the content item;

generating a plurality of popularity scores for content items selected from the plurality of content items based on the content items having the value for the one of the plurality of characteristics, wherein each popularity score of the plurality of popularity scores is based on weighting functions weighting differences in the plurality of social gestures for selected users of the plurality of selecting users associated with the value for the one of the plurality of characteristics of the plurality of characteristics more heavily than differences in the plurality of social gestures for other uses of the plurality of selecting users, wherein said each popularity score is normalized with respect to a popularity of each content item among the selected users and a popularity of each content item among the other users;

communicating a list of the selected content items ranked based on the popularity scores, the communicating based on the determining, associating, storing, receiving, and generating, and the communicating being performed by one or more modules incorporated into the social network system, the one or more modules implemented by one or more processors of the social network system.

2. The method of claim 1, wherein the one of the plurality of characteristics includes an industry in which the plurality of users are employed.

3. The method of claim 1, wherein the communicating of the list is based on a registering by the user of the value for the one of the plurality of characteristics with respect to a network update stream of the social network system.

4. The method of claim 1, wherein the plurality of social gestures includes liking, sharing, saving, commenting, voting, and reading.

5. A system comprising:

one or more computer processors;

a computer-readable medium having instructions stored thereon, which, when executed by the one or more computer processors, cause the system to, at least:

determine a plurality of selections of a plurality of content items from a network update stream by a plurality of selecting users of a social neatwork system, the determining of the plurality of selections based on a plurality of social gestures made by each selecting user of the plurality of selecting users with respect to the plurality of content items;

associate a plurality of characteristics of the plurality of selecting users with the plurality of content items, the associating including annotating the plurality of content items with metadata pertaining to the plurality of characteristics;

store the plurality of content items and the plurality of characteristics in an article database that is indexed to facilitate retrieval of the plurality of content items from the database based on the plurality of characteristics;

receive a search query from a searching user of the social network system, the search query specifying a value for one of the plurality of characteristics that includes an industry instead of keywords pertaining to the content item;

generate a plurality of popularity scores for content items selected from the plurality of content items based on the content items having the value for the one of the plurality of characteristics, wherein each popularity score of the plurality of popularity scores is based on weighting functions weighting differences in the plurality of social gestures for selected users of the plurality of selecting users associated with the value for the one of the plurality of characteristics of the plurality of characteristics more heavily than differences in the plurality of social gestures for other uses of the plurality of selecting users, wherein said each popularity score is normalized with respect to a popularity of each content item among the selected users and a popularity of each content item among the other users; and communicate a list of the selected content items ranked based on the popularity scores, the communicating based on the determining, the associating, the storing, the receiving, and the generating.

6. The system of claim 5, wherein the one of the plurality of characteristics includes an industry in which the plurality of users are employed.

7. The system of claim 5, wherein the communicating of the list is based on a registering by the user of the value for the one of the plurality of characteristics with respect to a network update stream of the social network system.

8. The system of claim 5, wherein the plurality of social gestures includes liking, sharing, saving, commenting, voting, and reading.

9. A non-transitory machine-readable storage medium embodying a set of instructions that, when incorporated into a social network system as one or more modules, causes one or more processors of the social network system to perform operations, the operations comprising:

determining a plurality of selections of a plurality of content items from a network update stream by a plurality of selecting users of a social network system, the determining of the plurality of selections based on a plurality of social gestures made by each selecting user of the plurality of selecting users with respect to the plurality of content items;

associating a plurality of characteristics of the plurality of selecting users with the plurality of content items, the associating including annotating the plurality of content items with metadata pertaining to the plurality of characteristics;

storing the plurality of content items and the plurality of characteristics in an article database that is indexed to facilitate retrieval of the plurality of content items from the database based on the plurality of characteristics;

receiving a search query from a searching user of the social network system, the search query specifying a value for one of the plurality of characteristics that includes an industry instead of keywords pertaining to the content item;

generating a plurality of popularity scores for content items selected from the plurality of content items based on the content items having the value for the one of the plurality of characteristics, wherein each popularity score of the plurality of popularity scores is based on weighting functions weighting differences in the plurality of social gestures for selected users of the plurality of selecting users associated with the value for the one of the plurality of characteristics of the plurality of characteristics more heavily than differences in the plurality of social gestures for other uses of the plurality of selecting users, wherein said each popularity score is normalized with respect to a popularity of each content item among the selected users and a popularity of each content item among the other users; and communicating a list of the selected content items ranked based on the popularity scores, the communicating based on the determining, the associating, the storing, the receiving, and the generating.

10. The non-transitory machine-readable storage medium of claim 9, wherein the one of the plurality of characteristics includes an industry in which the plurality of users are employed.

11. The non-transitory machine-readable storage medium of claim 9, wherein the communicating of the list is based on registering by the user of the value for the one of the t of characteristics with respect to a network update stream of the social network system.

12. The non-transitory machine-readable storage medium of claim 9, wherein the plurality of social gestures includes liking, sharing, saving, commenting, voting, and reading.

* * * * *

UNITED STATES PATENT AND TRADEMARK OFFICE

CERTIFICATE OF CORRECTION

PATENT NO. : 9,697,285 B2
APPLICATION NO. : 14/592810
DATED : July 4, 2017
INVENTOR(S) : Blue et al.

It is certified that error appears in the above-identified patent and that said Letters Patent is hereby corrected as shown below:

In the Claims

In Column 21, Line 22, in Claim 11, after "wherein", delete "the"

In Column 21, Line 23, in Claim 11, after "on", insert --a--

In Column 21, Line 23, in Claim 11, delete "t" and insert --plurality-- therefor Signed and Sealed this
Tenth Day of April, 2018

Andrei Iancu
*Director of the United States Patent and Trademark Office*